(12) United States Patent
Papania et al.

(10) Patent No.: US 11,047,434 B2
(45) Date of Patent: Jun. 29, 2021

(54) ONE-WAY CLUTCH OPERABLE WITH ONE OR NO RACES AND WITHOUT RACE POCKETS FOR LOCKING ELEMENTS

(75) Inventors: James R. Papania, Bolingbrook, IL (US); Thomas Kos, Orland Park, IL (US); Douglas Slager, Wheaton, IL (US); Andrew Horner, Oxford, MS (US)

(73) Assignee: BorgWarner Inc., Auburn Hills, MI (US)

( * ) Notice: Subject to any disclaimer, the term of this patent is extended or adjusted under 35 U.S.C. 154(b) by 992 days.

(21) Appl. No.: 12/738,747

(22) PCT Filed: Oct. 20, 2008

(86) PCT No.: PCT/US2008/080506
§ 371 (c)(1),
(2), (4) Date: May 18, 2010

(87) PCT Pub. No.: WO2009/052499
PCT Pub. Date: Apr. 23, 2009

(65) Prior Publication Data
US 2010/0288592 A1 Nov. 18, 2010

Related U.S. Application Data

(60) Provisional application No. 61/043,638, filed on Apr. 9, 2008, provisional application No. 60/999,700, filed on Oct. 19, 2007.

(51) Int. Cl.
*F16D 41/12* (2006.01)
*F16H 41/24* (2006.01)
*F16D 41/069* (2006.01)

(52) U.S. Cl.
CPC .......... *F16D 41/12* (2013.01); *F16D 41/069* (2013.01); *F16H 2041/246* (2013.01)

(58) Field of Classification Search
CPC .... F16H 2041/246; F16D 41/12; F16D 41/06; F16D 41/07; F16D 41/069
(Continued)

(56) References Cited

U.S. PATENT DOCUMENTS 1,767,593 A * 6/1930 Laabs ............................. 192/42
2,232,090 A * 2/1941 Anderson ................ 192/45.005
(Continued)

OTHER PUBLICATIONS

International Search Report PCT/US2008/080506; report filed Jul. 17, 2009.

*Primary Examiner* — Charles A Fox
*Assistant Examiner* — Ryan P Dodd
(74) *Attorney, Agent, or Firm* — von Briesen & Roper, s.c.

(57) ABSTRACT

The present disclosure sets forth a one-way clutch. The one-way clutch can function with one or no races as opposed to conventional prior art one-way clutches. In so doing, the overall size and weight requirements of the one-way clutch are drastically reduced, which in turn drastically reduces the overall size and weight requirements of the transmission and vehicle employing the transmission as well. The present disclosure also provides a one-way clutch having an outer race provided by axially spaced plates. An inner race is rotatably mounted with respect to one of the plates and the inner race has a ratchet surface. Ratchet pawls are pivotably mounted with respect to the plates and have unidirectional engagement with the ratchet surface of the inner race. In addition to reducing material and labor production costs, such lessened size and weight penalties translate into higher transmission efficiency and better vehicle fuel economy.

5 Claims, 14 Drawing Sheets

(58) Field of Classification Search
USPC .................................. 60/345, 346; 192/45.1
See application file for complete search history.

(56) References Cited

U.S. PATENT DOCUMENTS

| | | | | |
|---|---|---|---|---|
| 2,323,353 A | * | 7/1943 | Plog | 192/46 |
| 2,710,504 A | * | 6/1955 | Dodge | F16H 61/60 |
| | | | | 188/82.7 |
| 3,545,581 A | * | 12/1970 | Kent | F16D 41/07 |
| | | | | 192/104 B |
| 3,702,649 A | * | 11/1972 | Giese | F16D 41/07 |
| | | | | 192/104 B |
| 3,844,391 A | * | 10/1974 | Hallerberg | F16D 41/084 |
| | | | | 192/104 B |
| 4,187,728 A | * | 2/1980 | Mazzorana | 74/6 |
| 4,275,805 A | * | 6/1981 | Crankshaw | F16D 41/18 |
| | | | | 192/35 |
| 4,548,316 A | * | 10/1985 | Maurer | B65G 43/06 |
| | | | | 192/48.92 |
| 5,125,487 A | * | 6/1992 | Hodge | F16D 41/067 |
| | | | | 192/3.34 |
| 5,156,245 A | | 10/1992 | Hujiwara et al. | |
| 5,383,542 A | * | 1/1995 | Stockton | F16D 41/07 |
| | | | | 192/103 B |
| 5,855,263 A | * | 1/1999 | Fergle | F16D 41/12 |
| | | | | 192/108 |
| 5,966,985 A | | 10/1999 | Shuto et al. | |
| 6,167,998 B1 | | 1/2001 | Kinoshita | |
| 6,338,403 B1 | * | 1/2002 | Costin | F16D 41/12 |
| | | | | 192/107 T |
| 6,612,107 B2 | * | 9/2003 | Sato | 60/345 |
| 6,814,203 B2 | | 11/2004 | Kamiya et al. | |
| 6,855,085 B1 | * | 2/2005 | Gumpoltsberger | F16H 37/021 |
| | | | | 475/211 |
| 7,878,316 B2 | * | 2/2011 | Joppeck | F16D 41/12 |
| | | | | 192/46 |
| 2002/0005326 A1 | * | 1/2002 | Muramatsu | 192/46 |
| 2002/0153217 A1 | * | 10/2002 | Sato | F16D 41/069 |
| | | | | 192/45.1 |
| 2006/0021840 A1 | * | 2/2006 | Kimes et al. | 192/46 |
| 2007/0205069 A1 | * | 9/2007 | Keshtkar | F16D 41/12 |
| | | | | 192/46 |
| 2010/0075799 A1 | * | 3/2010 | Suzuki | F16H 61/0437 |
| | | | | 477/44 |

* cited by examiner

ONE-WAY CLUTCH OPERABLE WITH ONE OR NO RACES AND WITHOUT RACE POCKETS FOR LOCKING ELEMENTS

CROSS-REFERENCE TO RELATED APPLICATION

This is a U.S. national stage patent application under 35 USC 371 of International Patent Application No. PCT/US2008/080506, filed on Oct. 28, 2008, and claiming priority under 35 USC 119(e) to U.S. Provisional Patent Application No. 61/043,638, filed on Apr. 9, 2008 and claiming priority under 35 USC 119(e) to U.S. Provisional Patent Application No. 60/999,700 filed on Oct. 19, 2007.

FIELD OF THE DISCLOSURE

The present disclosure generally relates to transmission components, and more particularly relates to one-way clutches used in transmission components.

BACKGROUND OF THE DISCLOSURE

One-way clutches are commonly employed devices to allow for controlled transmission of rotational energy. More specifically, a one-way clutch can be used to allow for two rotational components to move in unison when the components are moved relative to each other in a first direction, but disengage and not allow relative rotation when moved in the opposite direction. Such clutches are well-known and can be of various types including, but not limited to, sprag type one-way clutches, roller-type one-way clutches, and pawl or ratchet type one-way clutches.

The type of one-way clutch employed for a given transmission application will be dictated by a number of parameters including, but not limited to, the desired load capacity for the clutch, and space limitations in the machine employing the clutch. For example, sprag and roller type one-way clutches typically require a smaller dimensional footprint than a ratchet or pawl clutch, but at the same time provide lesser load capacities.

One particular application which may employ a one-way radial ratchet clutch is in the coupling between a rotating drive shaft of a vehicle transmission and a torque converter of the transmission. When increased torque is demanded by the vehicle employing the transmission, for example during acceleration, it may be desirable for the rotating components of the torque converter to be engaged with the drive shaft. In other situations, such as idling, or when the vehicle attains speed, it may be desirable for the two components to be disengaged. In such situations, a one-way clutch can be positioned between a stator and stator support of the torque converter to allow for such selective engagement and disengagement.

Conventionally, such a one-way radial ratchet clutch would include an inner race and an outer race with a ratchet or a pawl provided between the inner and outer races. The pawl can be oriented so as to engage or disengage from notches provided either in the inner or outer race. When it is desired for the torque converter to be activated, the pawl can be engaged with one of the notches to join the components together in rotation. Once sufficient torque has been provided, the one-way clutch can be disengaged, to allow for the inner race to free-wheel.

Examples of such radial one-way clutches are provided in a number of prior patents issued to the present assignee including, but not limited to, U.S. Pat. Nos. 5,954,174; 5,947,257; 5,971,122; 6,109,410; and 6,125,979. While such approaches have been successful, it would desirable to reduce the overall size and weight associated with the one-way clutch system. In doing so, not only would material savings be enjoyed in the clutch system itself, but the overall size of the torque converter and other components of the transmission as a whole, may be reduced as well.

SUMMARY OF THE DISCLOSURE

In accordance with one aspect the disclosure, a one-way clutch assembly is disclosed which may include a first plate, a second plate, and a friction member rotatably mounted between the first and second plates, wherein the friction member may be adapted to directly engage an adjacent rotatable component of a transmission without any races being employed.

In accordance with another aspect of the disclosure, a one-way clutch is disclosed which may include a first rotatable component of a transmission, a second rotatable component of a transmission, a first plate positioned between the first rotatable component and the second rotatable component, a second plate positioned between the first rotatable component and the second rotatable component, and a pawl rotatably mounted between the first and second plates, wherein the pawl may be adapted to directly engage one of the rotatable components, and wherein at least one of the rotatable components may include at least one notch provided therein for receipt of the pawl.

In accordance with another aspect of the disclosure, a one-way clutch is disclosed which may include first and second outer connected annular plates which may be axially spaced from one another. An inner race may be rotatably mounted with respect to one of the plates and the inner race may have a ratchet surface. Ratchet pawls may be pivotably mounted with respect to the plates and have unidirectional engagement with the ratchet surface of the inner race.

These and other aspects and features of the disclosure will become more apparent upon reading the following detailed description when taken into consideration in conjunction with the accompanied drawings.

Figure 1:
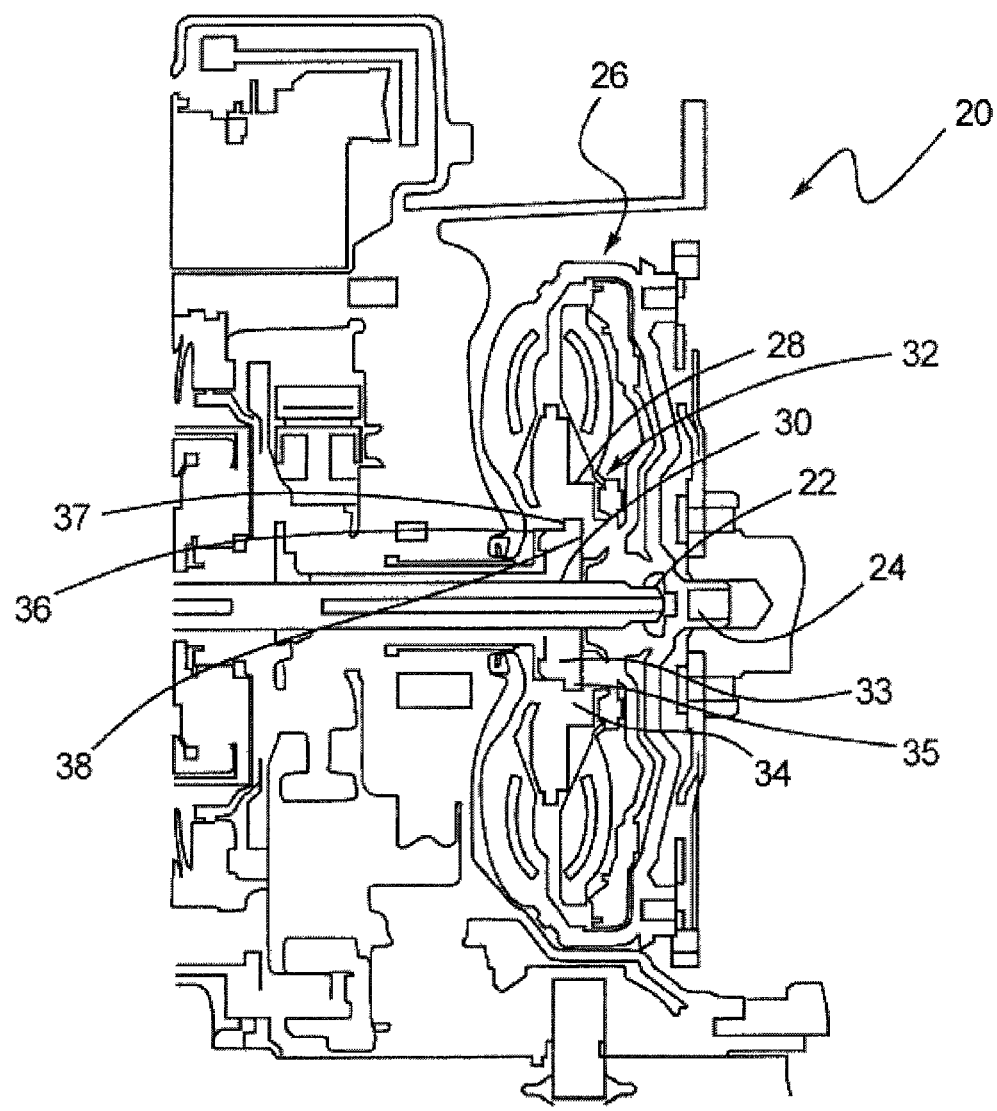
FIG. 1 is a sectional view of a portion of a transmission employing a prior art one-way clutch.

While the present disclosure is susceptible to various modifications and alternative constructions, certain illustrative embodiments thereof have been shown in the drawings and will described below in detail. It should be understood, however, that there is no intention to limit the present disclosure to the specific forms disclosed, but on the contrary, the intention is to cover all modifications, alternative constructions, and equivalents falling within the spirit and scope of the present disclosure.

DETAILED DESCRIPTION OF THE DISCLOSURE

Referring now to the drawings, and with specific reference to FIG. 1, a prior art transmission assembly may be generally referred to by reference numeral 20. While a particular transmission assembly 20 may be depicted, it is to be understood that FIG. 1 may be provided mainly for the purpose of depicting the prior art to more easily exemplify the differences and benefits provided by the present disclosure represented in the latter figures. In addition, the transmission assembly 20 of FIG. 1 may be but one example of the setting in which a one-way clutch may be employed. Other areas of a transmission, vehicle, machine tool, or other machine may also be advantageously employ its teachings as will be readily understood by one of ordinary skill in the art.

As shown in FIG. 1, the transmission 20 may include a central drive shaft 22 adapted to rotate about axis 24, which may be itself powered by the motive force of an engine (not shown) of a vehicle (also not shown). Positioned radially about the shaft 22 may be a torque converter 26. One of ordinary skill in the art will readily understand the functioning of the torque converter 26 and thus its explicit details will not be provided herein. For the purposes of this application, it is sufficient to note that the torque converter 26 may be typically employed by automatic transmissions to transfer engine torque to the transmission, allow the vehicle to come to a stop while not stalling, and selectively multiply the torque provided by the engine before transferring torque to the drive train of the vehicle.

It is also important to note that the torque converter 26 may include a stator 28 and a stator support 30. Depending on the times during which the vehicle employs the transmission 20 (e.g., acceleration, idling, constant speed, change in grade, etc.), the additional torque provided by the torque converter 26 may be called upon or not. Accordingly, a one-way clutch 36 may be mounted between the stator 28 and stator support 30 to selectively engage the two components. For example, when the added torque may be required by the vehicle, the torque converter from the one-way clutch can be engaged, and when not needed, the one-way clutch 32 can be disengaged to allow the stator 28 to free-wheel about the stator support 30.

Figure 2:
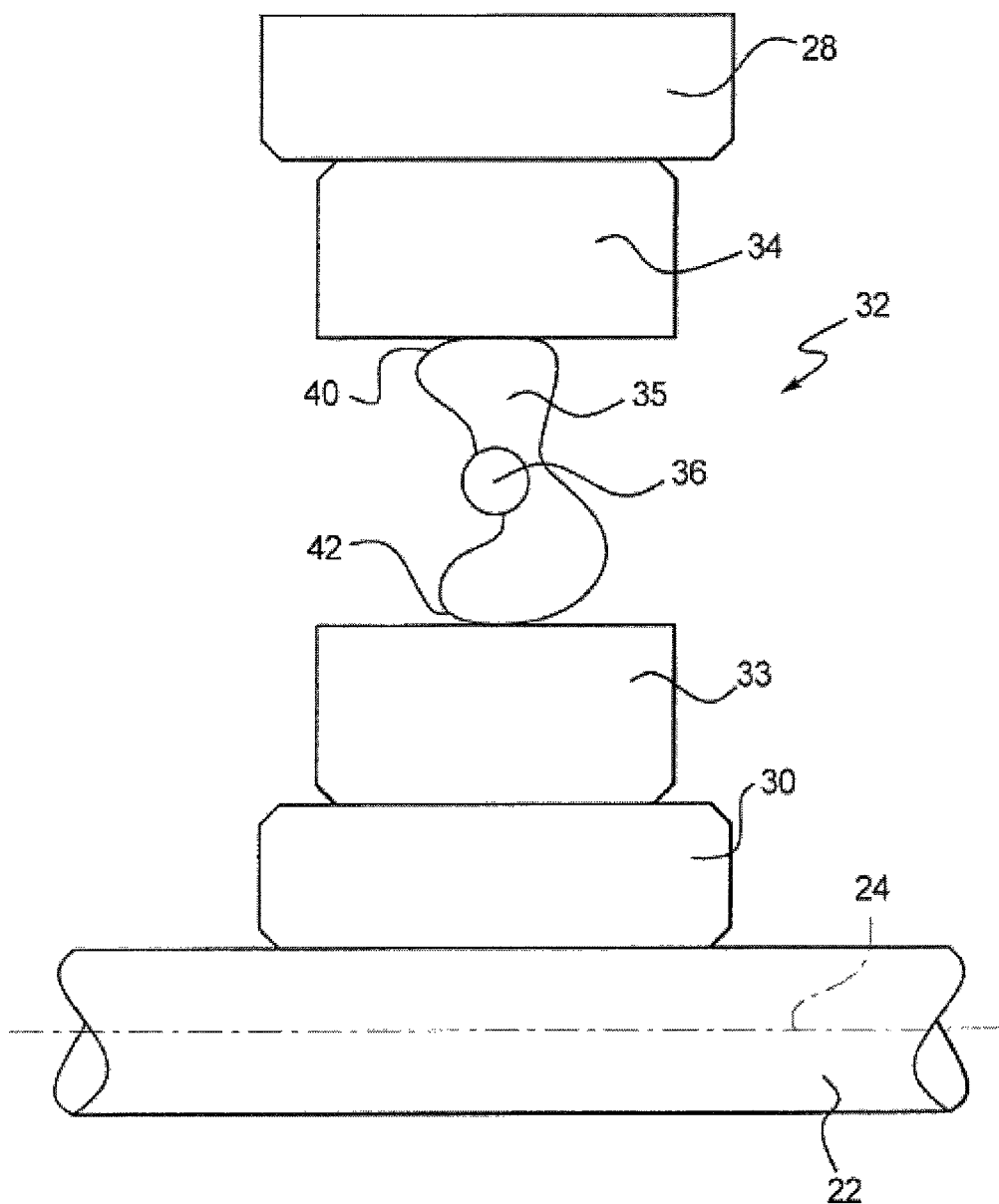
FIG. 2 is a schematic representation of the prior art one-way clutch of FIG. 1.

The one-way clutch of FIG. 1 is also shown schematically in FIG. 2 for better understanding and illustration of the components, and may be illustrated as a sprag-type one-way clutch. The one-way clutch 32 may include an inner race 33 provided radially adjacent the stator support 30, as well as an outer race 34 surrounding the inner race 33. To selectively control whether the inner race 33 and outer race 34 may be engaged, with a sprag-type clutch a moveable sprag 35 may be typically provided between the inner and outer races 33, 34. More specifically, a plurality of sprags 35 may be provided to circumferentially surround the inner and outer races 33 and 34, but in sectional view of FIG. 1, only two such sprags 35 may be depicted. The sprags 35 can be mounted for rotation in any number of different manners, but in the depicted embodiment it can be seen that a trunnion 36 may extend from both sides of the sprag 35 for mounting in bores provided in first and second discs 37, 38. Alternatively, a separate pin can be used for pivotal mounting of the sprag 35.

As shown best in FIG. 2, the sprags 35 may be substantially figure-eight shaped with curved ends 40 and 42 so that when one of the races 33, 34 move in a first direction, the sprags 35 pivot and bind the two races together for simultaneous rotation, and when that race is moved in an opposite, second direction, the two races may not be bound together, but rather free-wheel relative to each other.

In light of the foregoing, it can be seen that the overall size, diameter, and weight of the torque converter 26, and transmission assembly 20 itself, may be somewhat dictated by the inclusion of the one-way clutch 32. Space may be necessarily provided for mounting of the inner and outer races 33 and 34, as well as the sprags 35. In addition, splines or the like may need to be machined in the various components of the transmission, including but not limited to, the engagement between the inner race 33 and stator support 30. While effective, such features may add material and labor costs to the transmission and vehicle, and impose weight and size penalties on the transmission and vehicle as well, penalties which may be increasingly undesirable in the modern marketplace with its ever increasing fuel costs.

Figure 3:
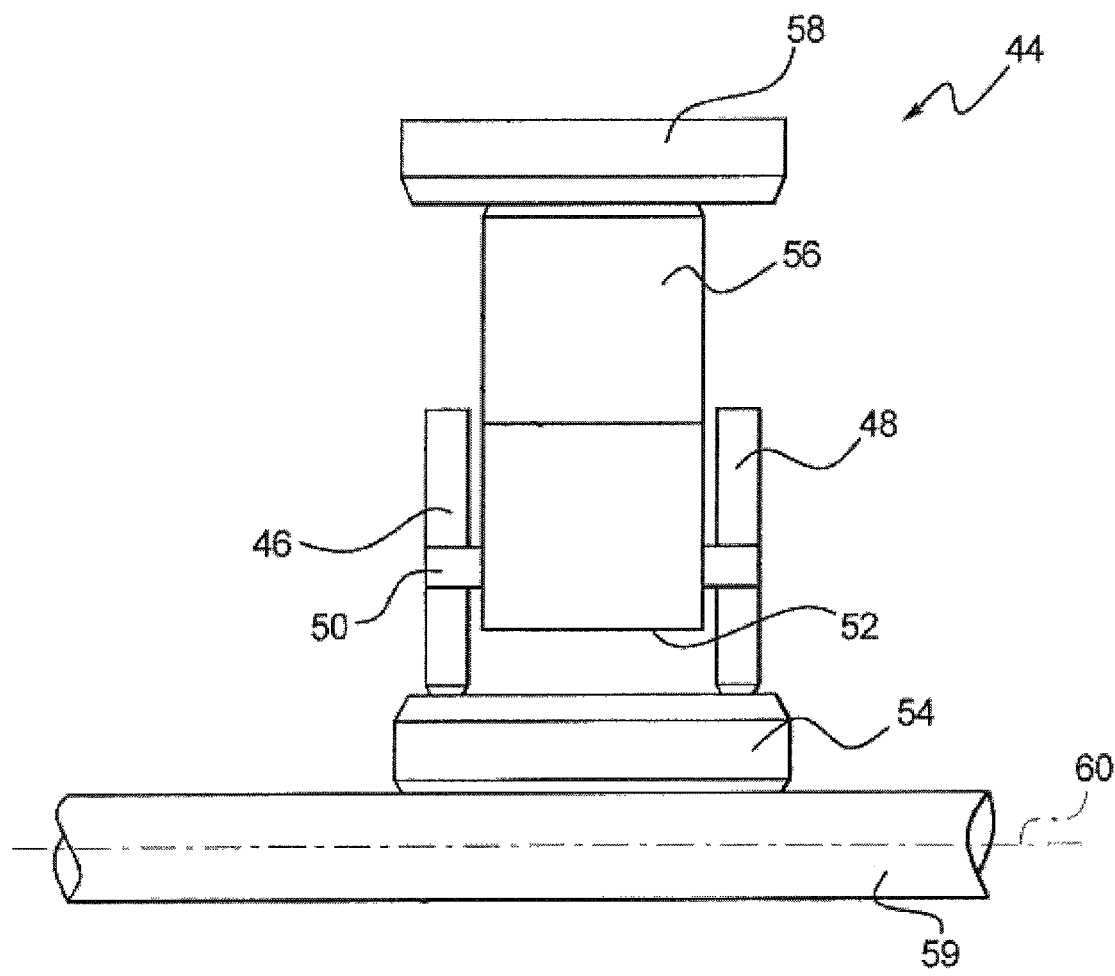
FIG. 3 a schematic representation of a one-way clutch constructed in accordance with the teachings of the disclosure and employing only one race.

However, with the present disclosure, those weight and size limitations may be drastically reduced by the elimination of one or more of the inner and outer races, and the novel arrangement of the one-way clutch disclosed herein. Referring now to FIG. 3, a schematic representation of a first embodiment of the present disclosure is depicted. As shown, the one-way clutch of the present disclosure may be generally referred to by reference numeral 44, and may be depicted as a radial ratchet type one-way clutch. Here, however, it is important to note that while the following disclosure may be made with respect to a radial ratchet one-way clutch, its teachings and the elimination of one or both races can be employed in conjunction with any other type of one-way clutch as well, including sprag type one-way clutches such as shown in FIGS. 1 and 2, roller type one-way clutches, and the like.

More specifically, the radial ratchet one-way clutch 44 may include a first mounting plate 46, an adjacent, parallel, second mounting plate 48, and a mounting pin 50 which may extend between the first and second plates 46 and 48 and may allow for a pawl 52 to rotate or pivot thereabout. Also, while not depicted, the pin 50 may be internal to the pawl 52 in the form of a trunnion or the like. However, in the depicted embodiment, the first and second plates 46 and 48, as well pin 50 and pawl 52 may extend from the stator support 54. In so doing, the plates 46 and 48, pin 50, and pawl 52 may be fixed to the stator support 54 and may be selectively engageable with only a single race, in this case an outer race 56. The outer race 56 may be in turn provided in engagement with the stator 58. As a result, the need for an inner race may be removed and thus the overall size of and weight of the assembly may be reduced as well. The stator support 54 may provide radial support of the drive shaft 59 via a bushing knot shown).

Figure 4:
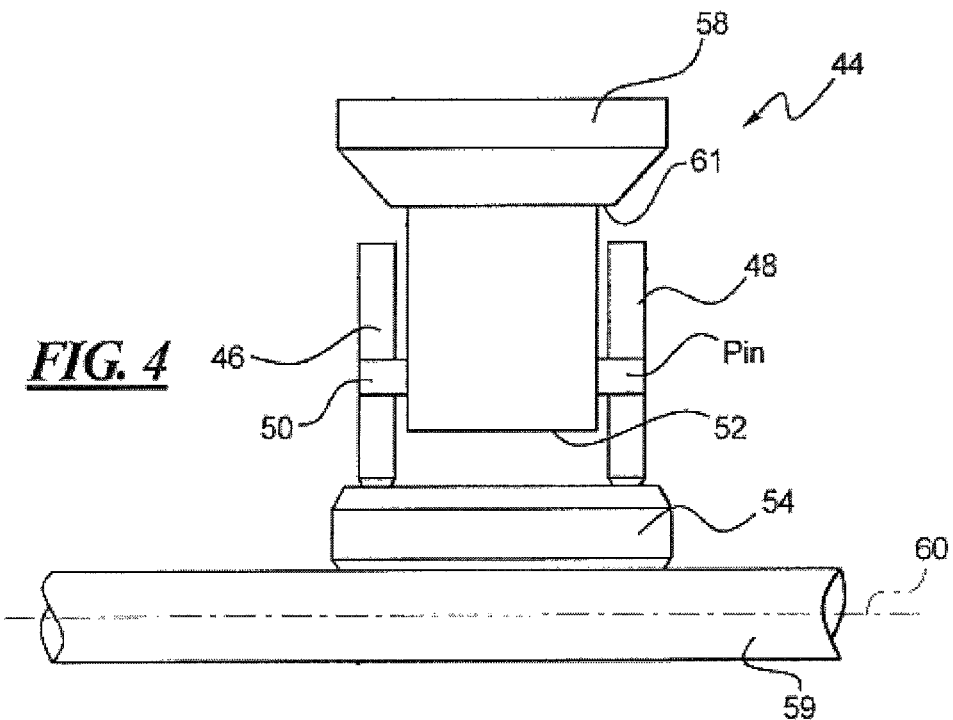
FIG. 4 is a schematic representation of a second embodiment of a one-way clutch constructed in accordance with the teachings of the disclosure and employing no races.
Figure 6:
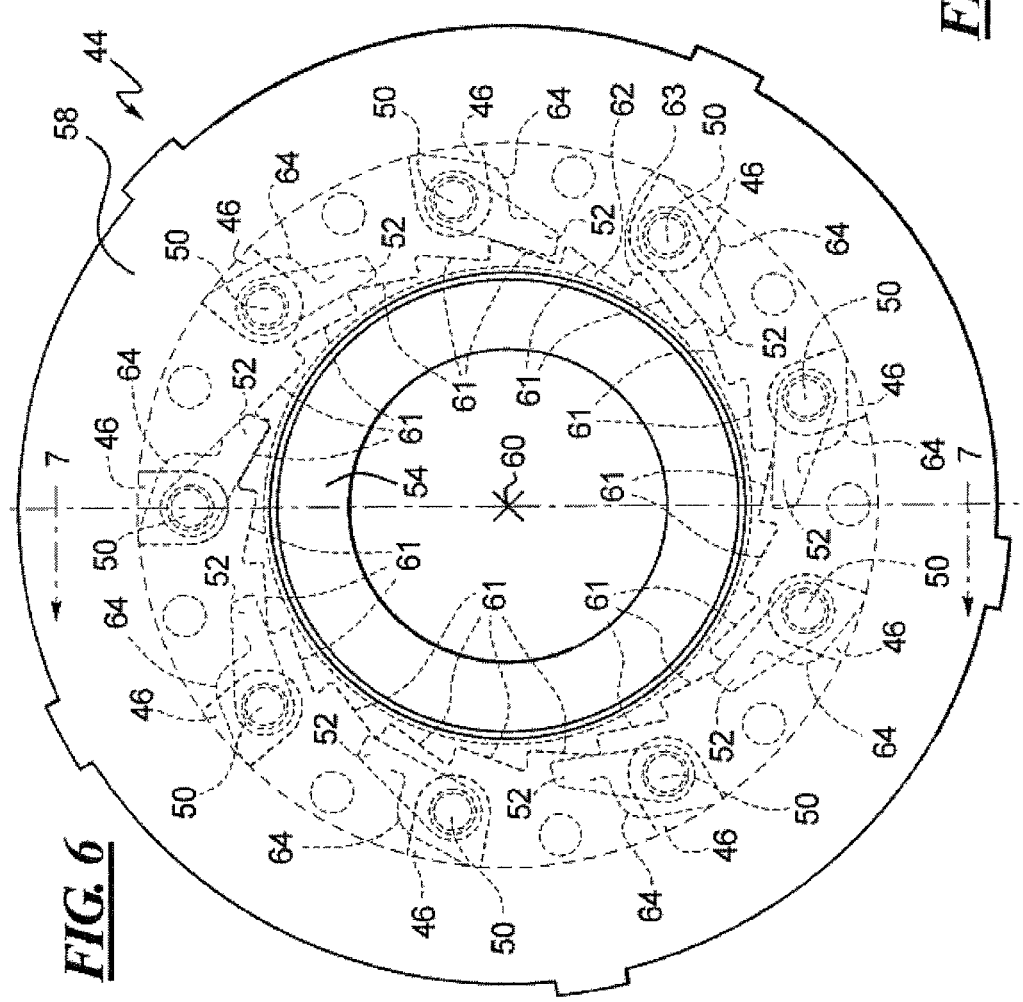
FIG. 6 is a plan view of a one-way clutch constructed in accordance with the teachings of the disclosure.

In a second embodiment depicted in FIG. 4, both the inner and outer races may be removed. In order to do so, again the first and second plates 46 and 48 may be provided with the pin 50 extending therebetween, and the pawl 52 may be adapted to rotate about the pin 50. However, rather than having the pawl 52 be engageable in the outer race, in the second embodiment, the pawl 52 may engage directly with the stator 58. To allow for such operation, a plurality of notches 61 may be provided not in a race of any kind, but directly within the stator 58 itself. As shown in FIG. 6, each of the notches 61 may be canted in the same direction so as to have a cam surface 62 and a shoulder 63. When the pawls 52 move along the cam surfaces 62 in a counter-clockwise direction (with respect to FIG. 6), the two components may be disengaged or overrunning. However, when the pawls 52 move in a clockwise direction, they meet the shoulders 63 and may cause the clutch as a whole to engage. As a consequence of this novel arrangement of components, both the inner and outer races conventionally used by one-way clutches may be removed, and the overall size of the one-way clutch may be drastically reduced.

Figure 5:
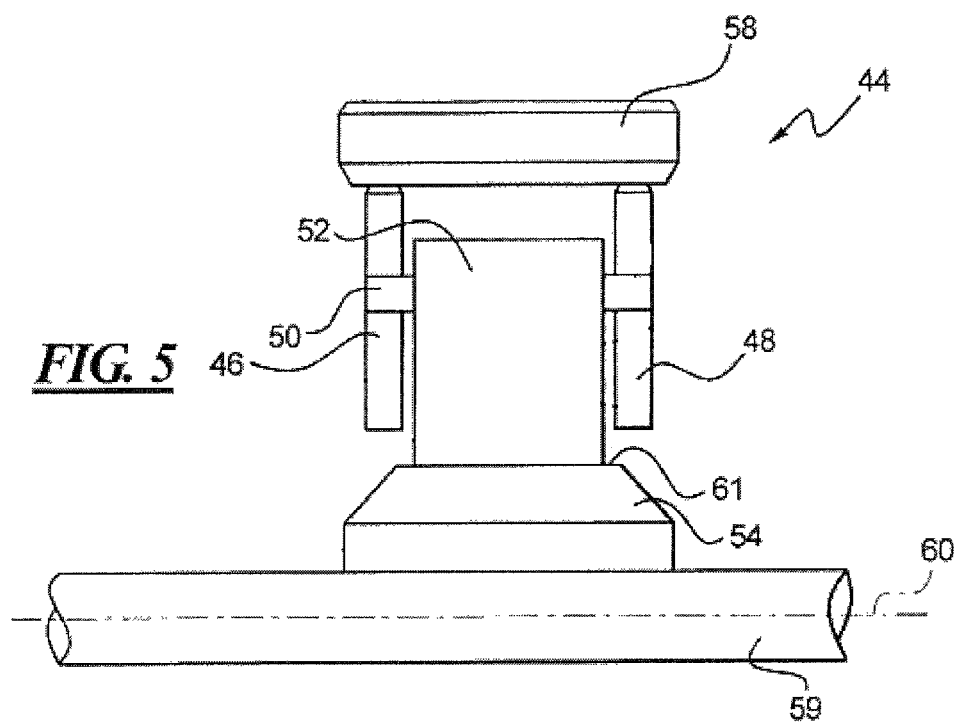
FIG. 5 is a schematic representation of a third embodiment of a one-way clutch constructed in accordance with the teachings of the disclosure and also using no races, but orienting the pawl in an opposite direction to that of the second embodiment.

With a third embodiment, depicted in FIG. 5, again a radial ratchet one-way clutch operable with no races may be provided. However, as opposed to the second embodiment, where the plates 46 and 48 extend directly from the stator support 54, in the third embodiment depicted in FIG. 5, the first and second plates, 46 and 48, respectively, may extend directly from the stator 58. Accordingly, converse to the second embodiment, the pawls 52 may selectively engage the notches 61 provided within the stator support 54, as opposed to the stator 58. While operating in an opposite direction, the one-way clutch with no-race functionality may be still afforded.

With both the second and third embodiments, one of ordinary skill in the art will understand that not only is the inner race removed, but the outer race is removed as well. This dramatically may reduce the overall size and weight requirements of the clutch, and thus torque converter and transmission as well. Aside from the material and labor savings in terms of production costs, this also directly may translate to better transmission efficiency, and fuel economy for the vehicle. As shown in each of FIGS. 3-5, a central drive shaft 59 rotates about an axis 60.

Figure 7:
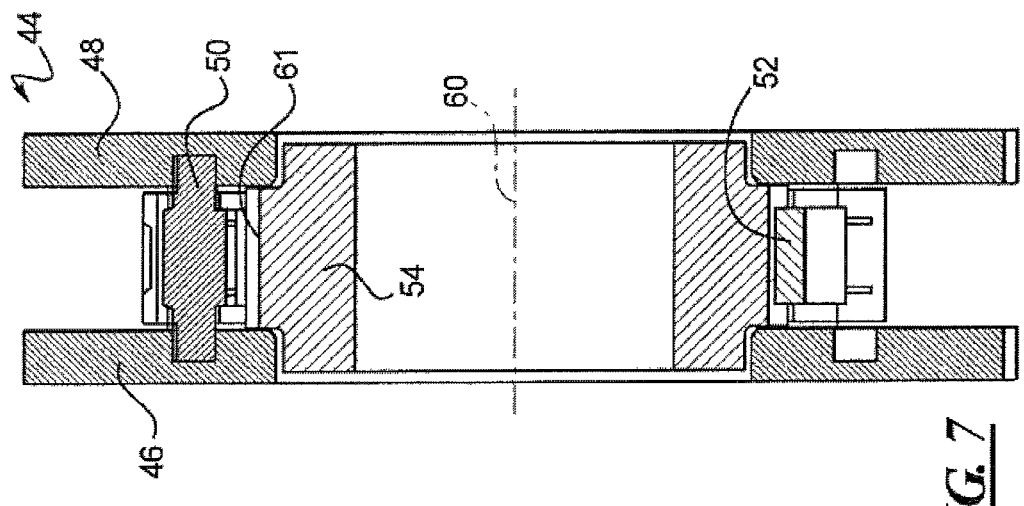
FIG. 7 is a sectional view of the one-way clutch of FIG. 6, and taken along line 7-7 of FIG. 6.

Referring now to FIGS. 6 and 7, a more detailed rendering of a radial ratchet one-way clutch 44 constructed in accordance with teachings of the disclosure is shown. Starting with FIG. 6, a plan view is depicted showing that the first and second plates 46, 48 may be provided in a plurality of matching sets about the circumference of the clutch. Also in this embodiment, the first and second sets of plates 46 and 48 may extend radially inwardly from the stator 58, and in turn the plurality of pawls 52 may be adapted to engage a plurality of notches 61 provided in the stator support 54. In this regard, it will be noted that a total of twenty-two notches 61 may be shown in FIG. 6, but it is to be understood that this may be only for illustrative purposes. Other embodiments can employ a greater or lesser number of notches 61. For example, more than twenty two notches, or less than twenty two notches, can be provided, including a number of notches that is less than, or equal to, the number of pawls.

Also shown in FIG. 6, it can be seen that each pawl 52 may be biased by a spring 64 into an inward position, i.e., toward the notches 61. The inward position in turn corresponds to the engaged position, wherein the pawls 52 may be forced into engagement with notches 61, thereby engaging the stator 58 with the stator support 54. Depending upon the strength and size of the spring 64, the pawl 52 can be caused to be centrifugally disengaged from notches 61 upon reaching a certain speed. In other words, upon reaching a specific RPM, the centrifugal force thereby generated will overpower the biasing force of the spring, and thus cause disengagement.

Figure 8:
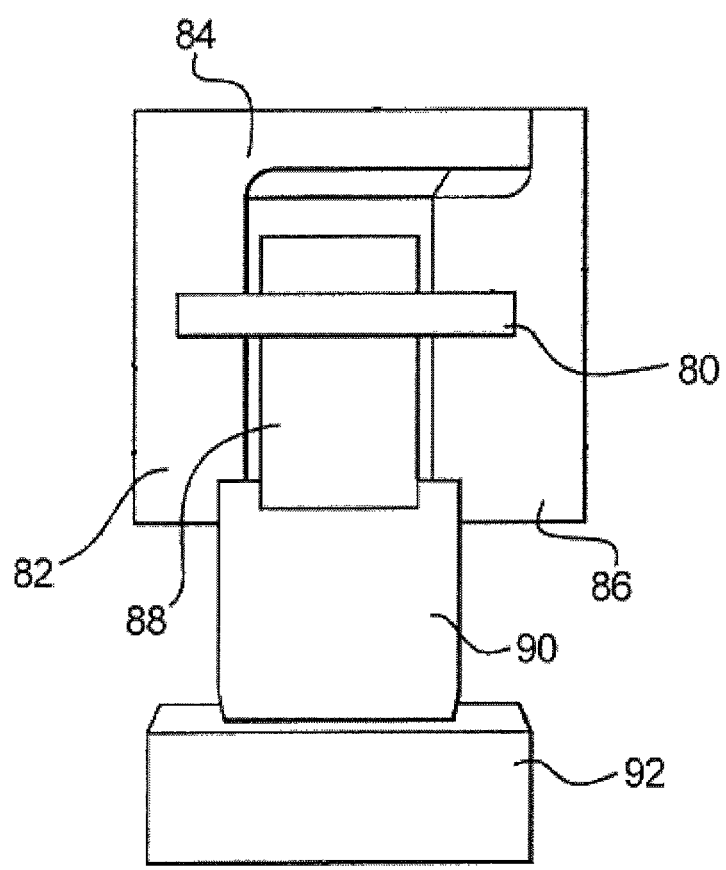
FIG. 8 is a schematic representation of a fourth embodiment of a one-way clutch constructed in accordance with the teachings of the disclosure, but without any side plates.
Figure 9:
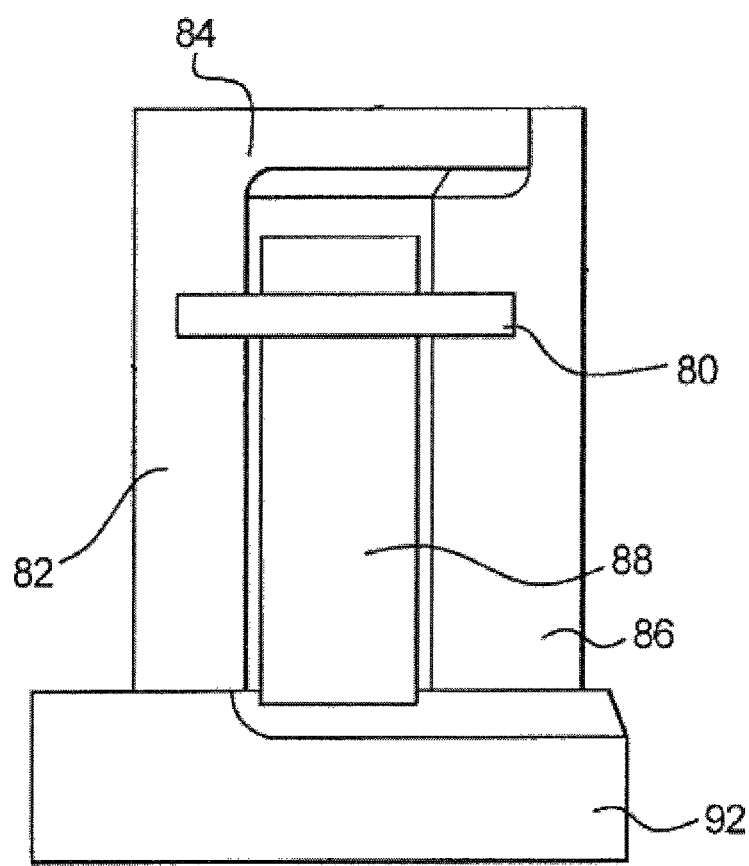
FIG. 9 is a schematic representation of a fifth embodiment of a one-way clutch similar to that of FIG. 8, but also without any races.

In still further embodiments, separate side plates 46 and 48 need not be provided, but rather a pin 80 could extend between existing components of the transmission 20. More specifically, as shown in FIG. 8, in one embodiment the pin 80 could extend between a plate 82 integral to the stator 84 and a thrust washer 86 already existing on the transmission 20. A pawl 88 can then be rotatably mounted to the pin 80 for selective engagement with an inner race 90, itself mounted to a stator support 92. The embodiment of FIG. 9 is similar to that of FIG. 8, but for the removal of the inner race 90 thereby allowing for direct engagement of the pawl 88 with the stator support 92. In so doing, it can be seen that the present disclosure may allow for production without any side plates and/or inner or outer races.

Figure 10:
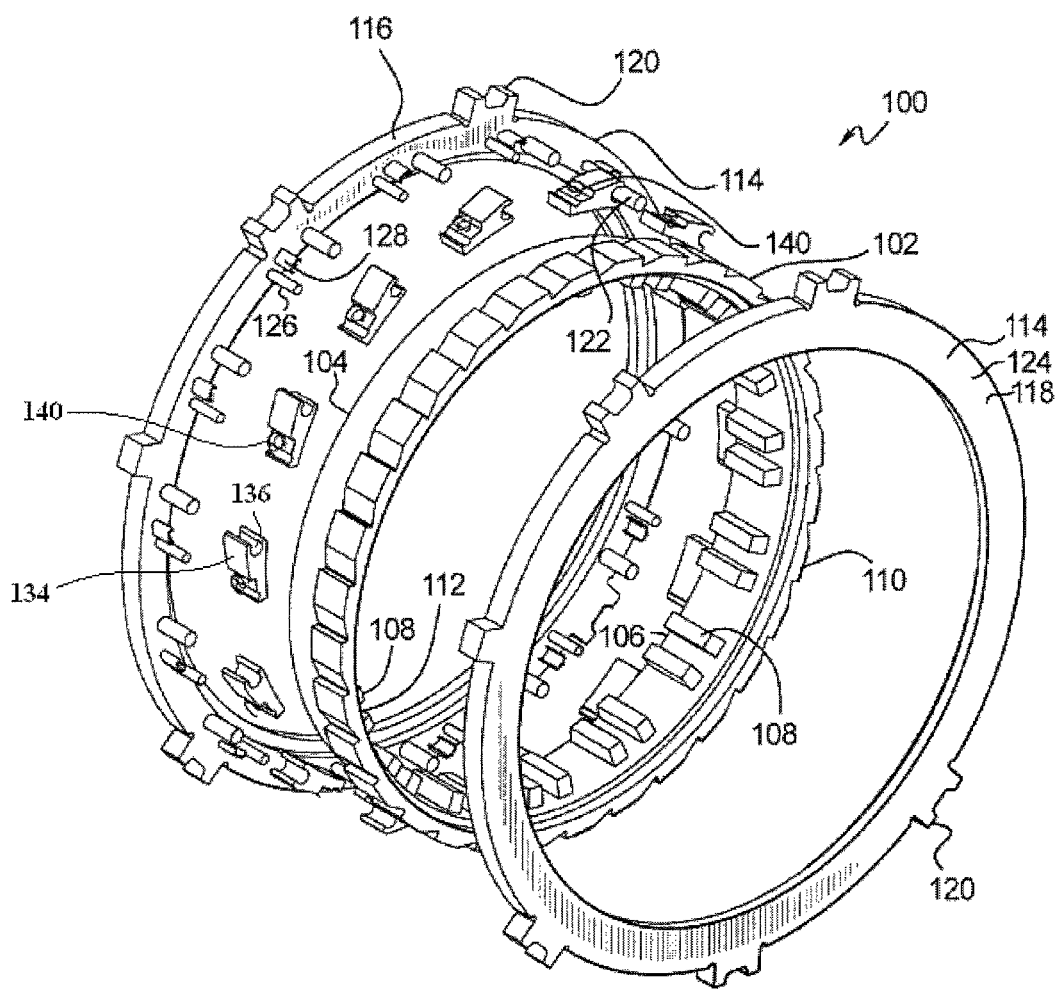
FIG. 10 is an exploded view of a sixth embodiment of a one-way clutch according to the present disclosure.
Figure 11:
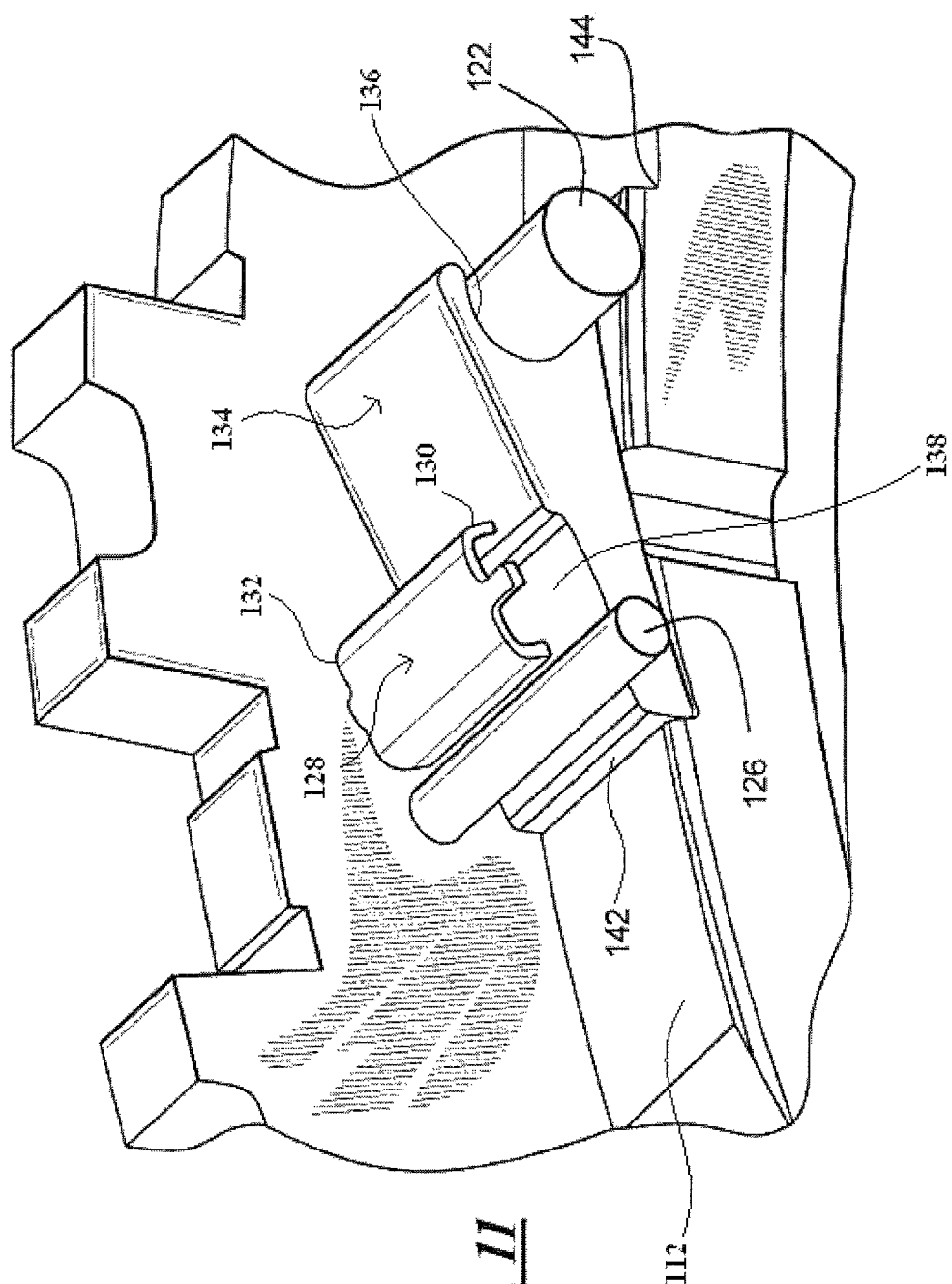
FIG. 11 is an enlarged perspective view of the one-way clutch shown in FIG. 10 with part of the outer race provided by a plate being removed for clarity of illustration.

FIGS. 10 and 11 illustrate another one-way clutch 100 according to the present disclosure. The clutch 100 may include an inner race 102. The inner race 102 may have an inner cylinder 104. The inner cylinder 104 may have an inner diameter 106 with spline teeth 108 allowing it to be connected with a rotating shaft or carrier (not shown). Integrally connected and axially slightly displaced from the inner cylinder 104 may be an outer cylinder 110. The outer cylinder 110 along its outer diameter may have a ratchet surface 112.

An outer race 114 may be provided by first and second axially spaced plates 116 and 118. The plates 116 and 118 both have tabs 120 to allow the plates 116 and 118 to be torsionally affixed with a casing structure of a transmission (not shown). In the example shown, the concentricity control between the inner race 102 and the outer race subassembly 114 may be controlled external to the clutch 100. As shown, clutch 100 may be non-concentrically controlling. Extending between the plates 116, 118 and connecting the same may be fasteners 122. The fasteners 122 may be typically threaded type fasteners having a shank threaded into blind bores extending into the plates 116, but could be rivets, knurled pins, welded pins, bonded pins, epoxy pins, or the like. The fasteners 122 may have a head or nut (not shown in all figures) abutting against the surface 124 of the plate 118. Additionally extending between the plates 116 and 118 may be a series of fastener shanks or pins 126. Extending between and connected with plates 116 and 118 may be a series of spring mounts 128. The spring mounts 128 may have extending barbs 130 that enter into corresponding slots 132 provided in a board surface of the plates 116, 118. Pivotally connected on the plates 116 and 118 via the pins 122 may be pawls 134. The pawl 134 may have a cylindrical slot 136 that may be open for less than 180° so as to hold on to the pin 122. The pawl 134 may have an indention 138 for receipt and capture of a spring 140 positioned between the indention 138 and the spring mount 128. The spring 140 may be a bent strip type spring. The pawl 134 may have an engagement head 142 for unidirectional engagement with a ratchet notch 144 of the ratchet surface 112. (In FIG. 11, the springs are not shown for clarity of the illustration.)

Figure 12:
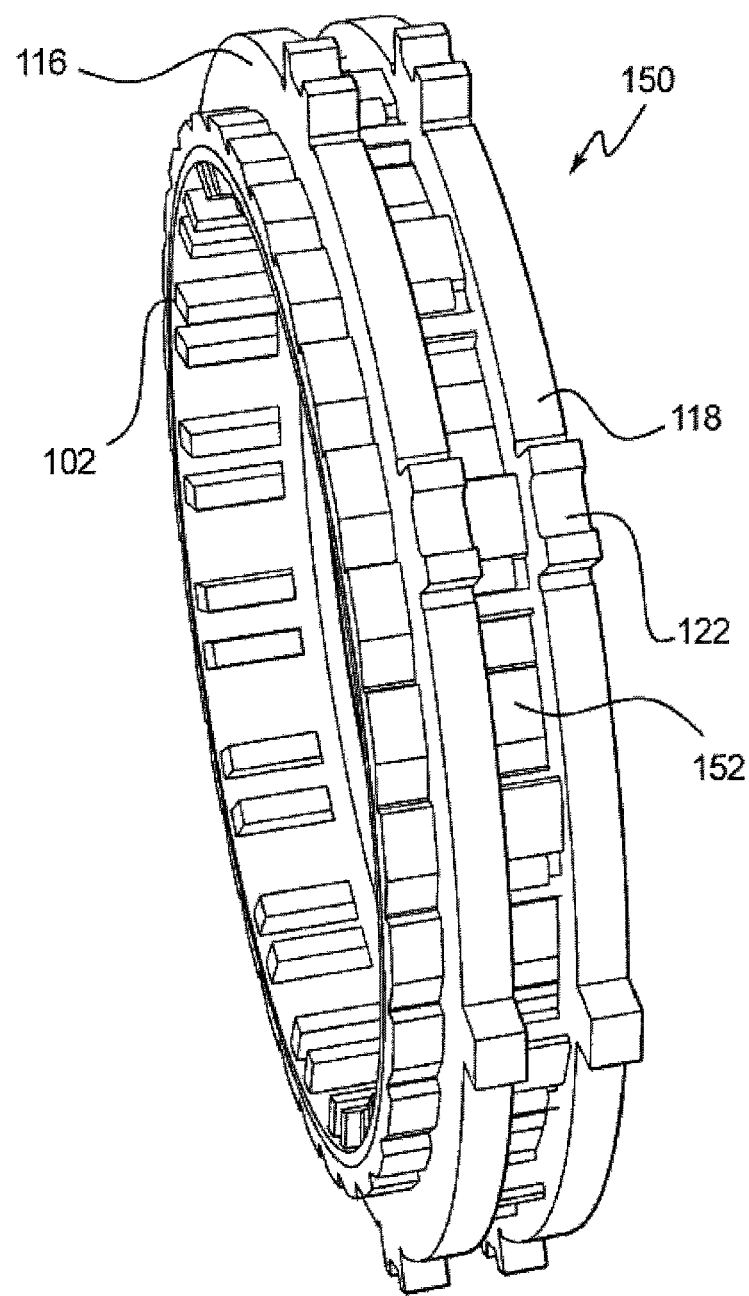
FIG. 12 is a perspective view of a seventh embodiment of a one-way clutch according to the present invention.
Figure 13:
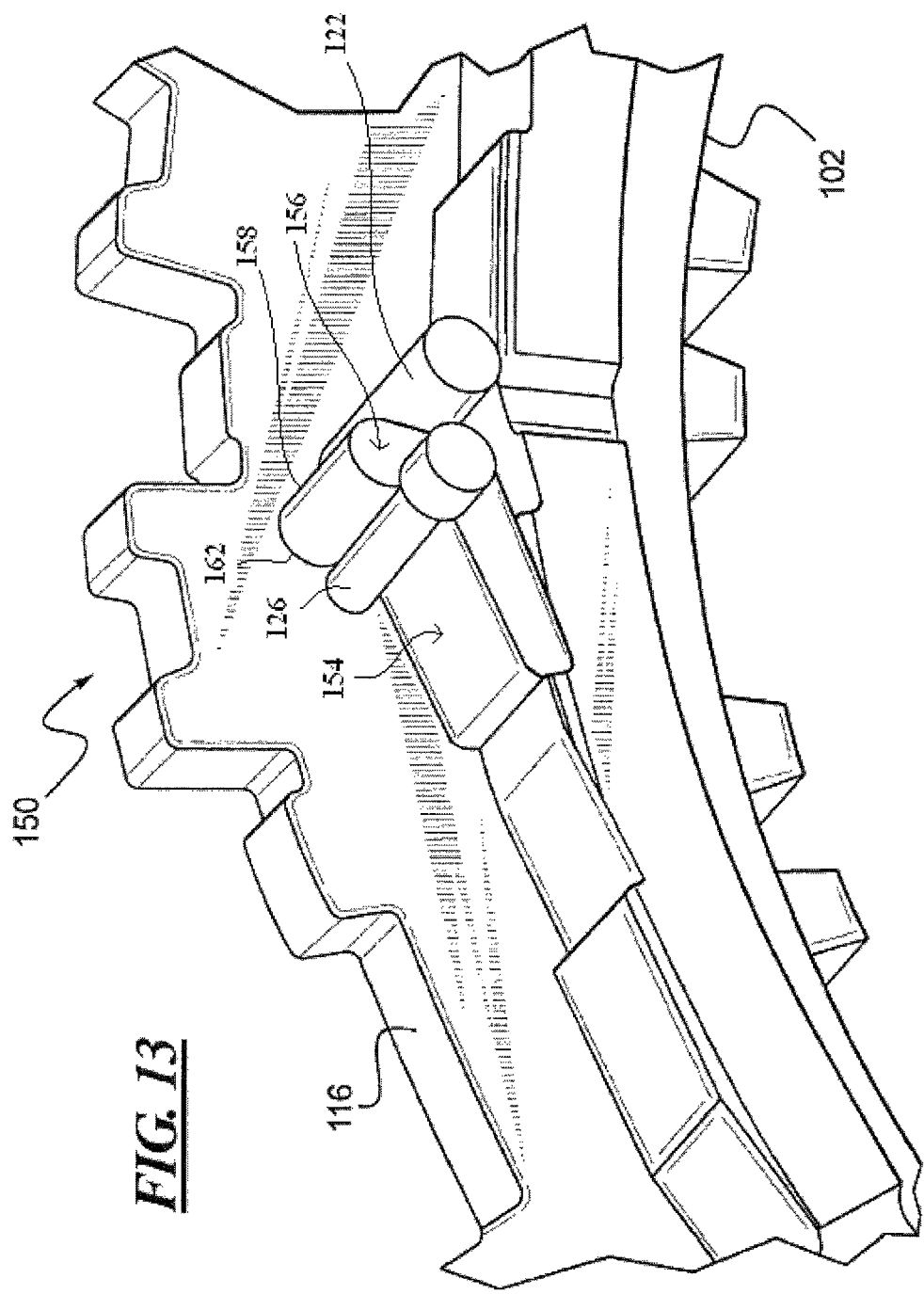
FIG. 13 is an enlarged perspective view of the clutch shown in FIG. 12 with a plate of the outer race being removed for clarity of illustration.

FIGS. 12 and 13 illustrate an alternative clutch 150 of the present disclosure having a position limiter 152. Each pawl 154 of this embodiment may have a head 156 with a concave curvilinear edge surface 158 for engagement with the fasteners 122. The pawl 154 also may have generally opposing the surface 158 a concave curvilinear edge surface 162 for engagement with the pin 126.

Figure 14:
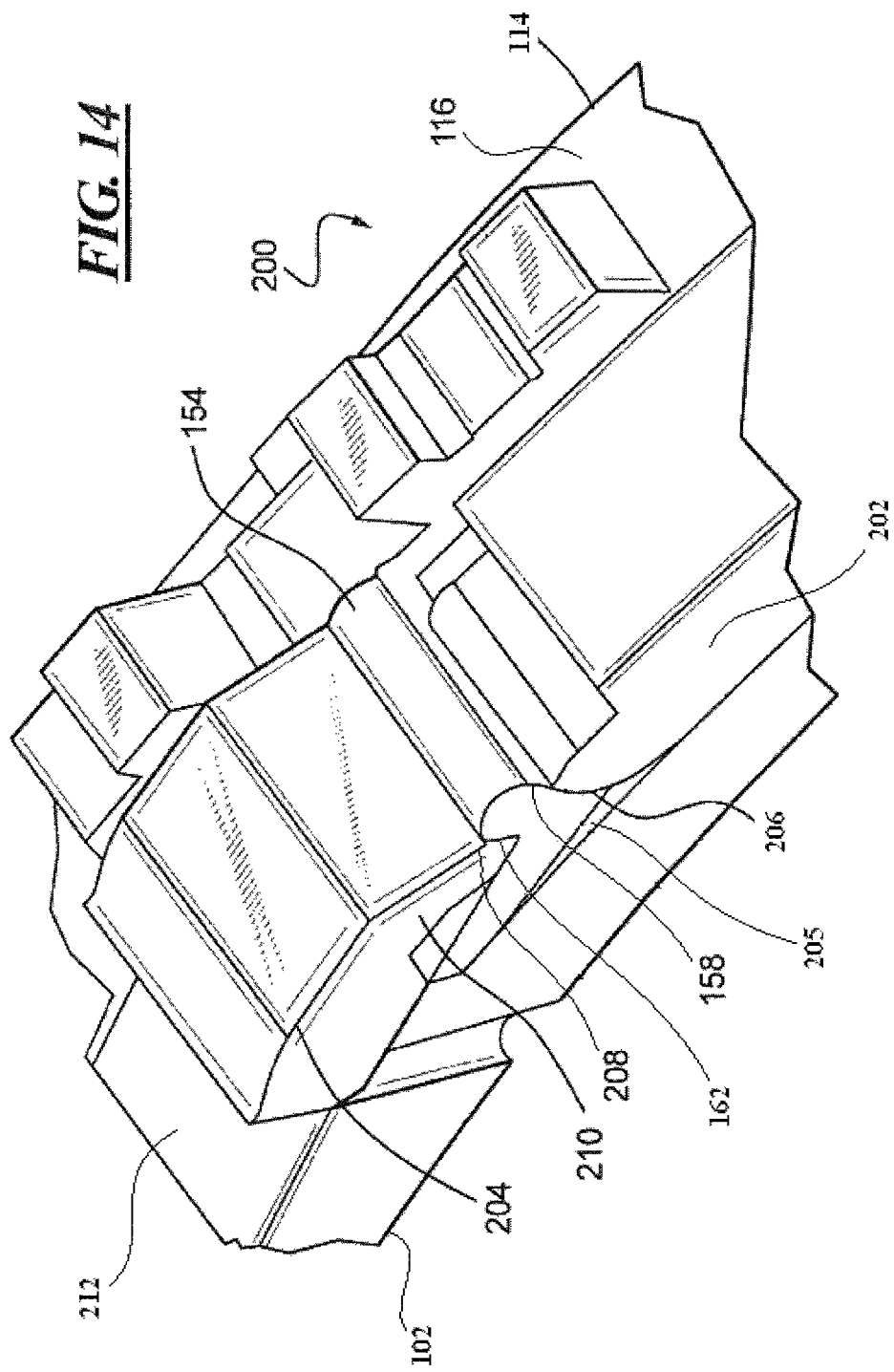
FIG. 14 is an enlarged perspective view similar to FIG. 13 but of an eighth embodiment of a one-way clutch according to the present disclosure.

Referring to FIG. 14, another alternative embodiment clutch 200 of the present disclosure may have adjacent weldments 202 and 204 to hold the plates 116 and 118 together. (Plate 118 is not shown in FIG. 12). Positioned in a gap 205 between the adjacent weldments 202 and 204 may be the pawl 154. The weldment 202 may have a convex surface 206 for engagement with the concave surface 158 of the pawl 154. In a similar manner, weldment 204 may have a tip 208 to engage the surface 162 with pawl 154. The weldment 204 also may have an arm 210 for mounting a spring 211 (not shown) that biases the pawl 154 into engagement with a ratchet surface 212 of the inner race 102. The ratchet surface 212 may have unidirectional engagement with a pawl 214 (not shown) carried by the outer race 114 via pin 216 (not shown).

Figure 15:
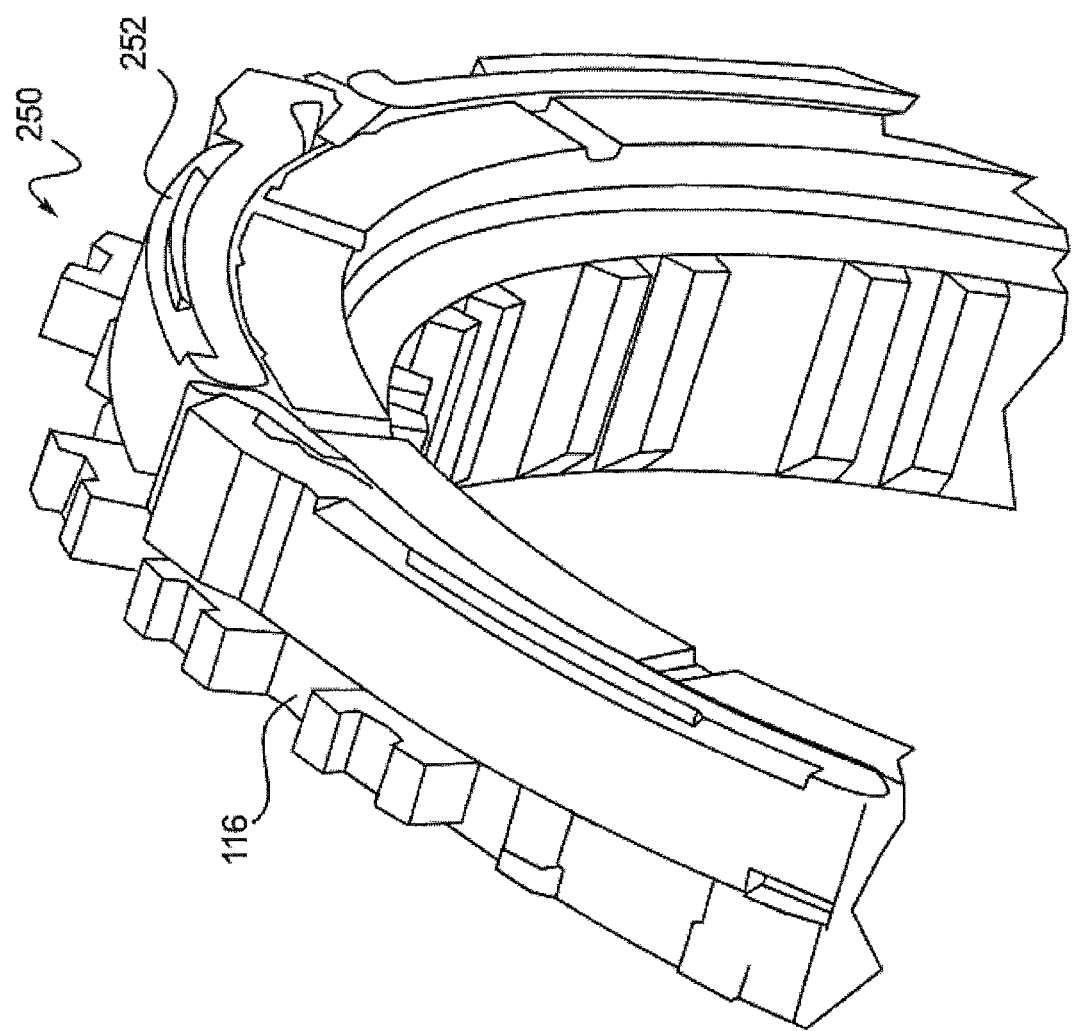
FIG. 15 is an enlarged perspective view similar to FIG. 13 of a ninth embodiment of a one-way clutch according to the present disclosure.

Referring to FIG. 15, another embodiment of the present disclosure has a clutch 250 with weldments 252. The weldments 252 may be common with one another having an end substantially similar to the previously described weldment 202 and an opposite, end substantially similar to the weldment 204.

Figure 16:
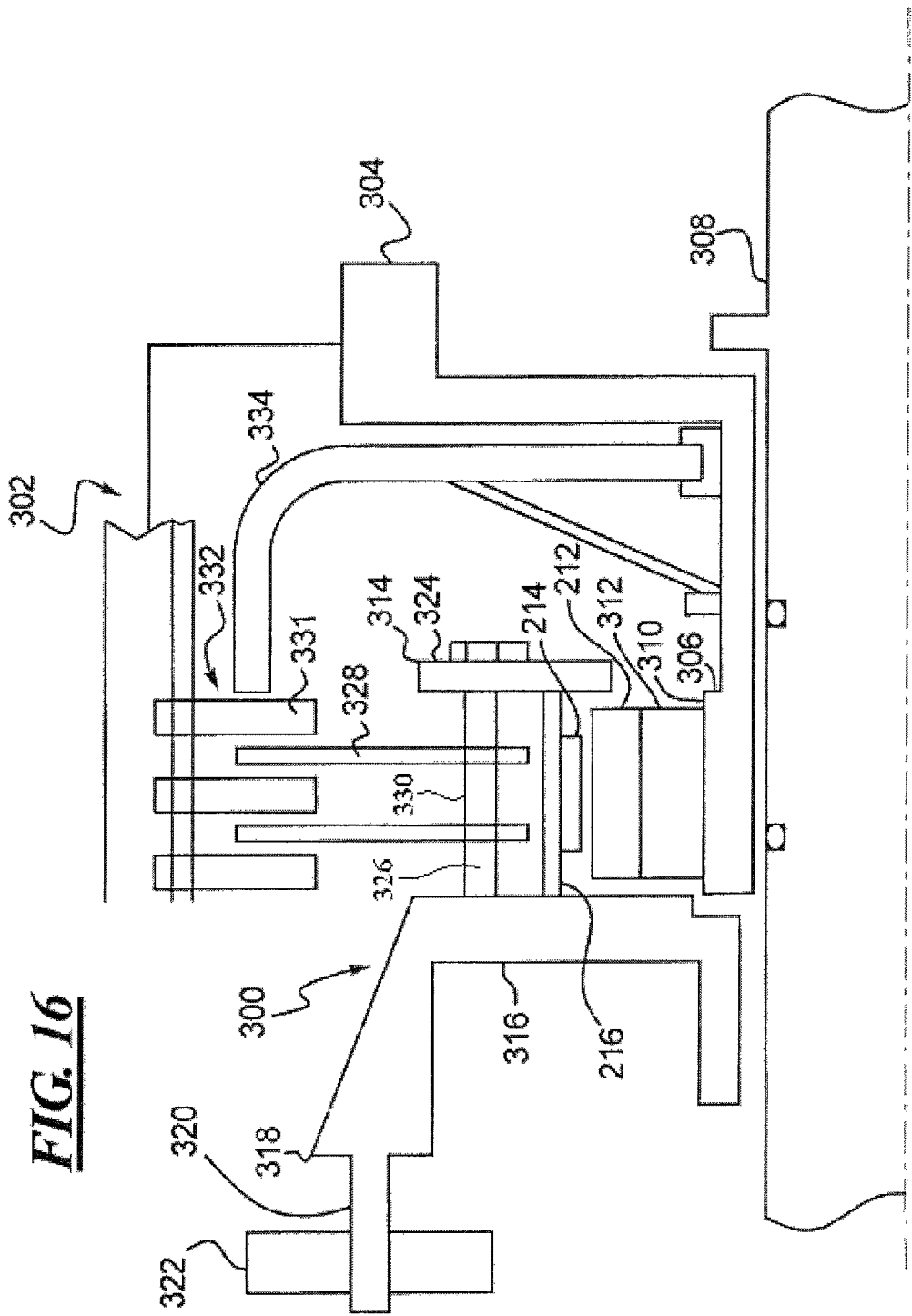
FIG. 16 is a schematic view of a tenth embodiment of a one-way clutch according to the present disclosure wherein a carrier provides one of the plates for the outer race.

Referring to FIG. 16, yet another embodiment of the present disclosure is a clutch 300 provided in the environment of a transmission 302. The transmission 302 may have a support 304 that may be fixed with respect to a casing or structural frame of the transmission. The support 304 may have a cylindrical portion 306 that encircles a shaft 308. An outer diameter 310 of the cylindrical portion may be splined to an inner race portion 312 of the clutch 300.

The outer race 314 may have one side plate 316 which may be integral with a carrier 318 of the transmission. Carrier 318 may have a shaft 320 that may mount a planetary gear 322. Connecting the plate 316 with the outer plate 324 of the outer race 314 may be a series of fastener pins 326. The outer race 314 may be connected with friction discs 328 via the pins 326. The pins 326 can extend through the discs 328 or the discs can be mounted on an outer diameter 330 of the pins 326. The discs 328 along with separator plates 331 form a friction pack 332 that can be actuated by a piston 334.

Based on the foregoing, it can be seen that the present disclosure sets forth a one-way clutch which can function with one or no races or with a race having no race pockets for locking elements. In so doing, the overall size and weight requirements of the one-way clutch are drastically reduced, which in turn reduces the overall weight and size requirements of the torque converter and transmission, or other rotating components with which it is used, as well. Such improvements can directly translate into lower material and labor manufacturing costs, better transmission efficiency, and higher vehicle fuel economy. Moreover, the teachings of this disclosure can be employed to remove races of any type of one-way clutch, including radial ratchet type, sprag type, and roller type one-way clutches.

We claim:

1. A one-way clutch for an automotive transmission, comprising:
an axis;
a stator acting as an outer race rotatable about the axis;
a first plate positioned orthogonally to the axis and radially inwardly of the stator;
a second plate axially spaced from the first plate, the second plate also positioned radially inwardly of the stator;
a pawl rotatably mounted on a single pin extending through the pawl and supported by the first and second plates, the pawl adapted for rotation about the pin, and the pawl being fully contained between and extending radially outwardly of the first and second plates, and adapted to directly engage the stator;
a stator support positioned radially inwardly of the pawl, the stator support acting as an inner race;
wherein the first and second plates extend from the stator support, are radially spaced away from the stator, and a plurality of matching sets of the first and second plates are provided about the circumference of the stator support;
wherein the stator support is connected to and provides radial support of a drive shaft;
wherein the pin about which the pawl rotates is radially fixed relative to the stator support; and
wherein the stator and the stator support operatively engage when the pawl directly engages the stator.

2. The one-way clutch of claim 1, wherein the stator has notches for the pawl to directly engage.

3. A one-way clutch configured for control of an automatic vehicular transmission, the clutch comprising:
a first rotatable component of a transmission;
a second rotatable component of the transmission;
a first plate positioned between the first rotatable component and the second rotatable component;
a second plate positioned between the first rotatable component and the second rotatable component;
a single pin extending through the pawl and supported by the first and second plates; and
a pawl rotatably mounted on the pin, the pawl adapted for rotation about the pin, the pawl being fully contained between and extending radially outwardly of the first and second plates, and adapted to directly engage one of the rotatable components, one of the rotatable components including at least one notch provided therein for receipt of the pawl;
wherein the first and second plates extend from the other of the rotatable components not having the at least one notch, are radially spaced away from the rotatable component including the at least one notch, and a plurality of matching sets of the first and second plates are provided about the circumference of the rotatable component from which they extend;
wherein the second rotatable component is connected to a drive shaft;
wherein the pin about which the pawl rotates is radially fixed relative to the at least one rotatable component; and
wherein the first rotatable component and the second rotatable component operatively engage when the pawl directly engages the first rotatable component.

4. The one-way clutch of claim 3, wherein the first rotatable component is a stator acting as an outer race, and the second rotatable component is a stator support acting as an inner race connected to and providing radial support of a drive shaft.

5. The one-way clutch of claim 4, wherein the stator includes at least one notch for receipt of the pawl.

* * * * *